United States Patent

Kobayashi

[11] Patent Number: 5,254,052
[45] Date of Patent: Oct. 19, 1993

[54] POWER TRANSMITTING SYSTEM FOR A FOUR-WHEEL DRIVE MOTOR VEHICLE

[75] Inventor: Toshio Kobayashi, Tokyo, Japan

[73] Assignee: Fuji Jukogyo Kabushiki Kaisha, Tokyo, Japan

[21] Appl. No.: 698,677

[22] Filed: May 10, 1991

[30] Foreign Application Priority Data

May 23, 1990 [JP] Japan ............................. 2-134307

[51] Int. Cl.$^5$ .................... F16H 1/42; B60K 17/34
[52] U.S. Cl. .................... 475/249; 475/221
[58] Field of Search ............ 475/221, 223, 248, 249

[56] References Cited

U.S. PATENT DOCUMENTS

| | | | |
|---|---|---|---|
| 4,215,593 | 8/1980 | Shono et al. | 475/221 X |
| 4,417,642 | 11/1983 | Suzuki et al. | 475/221 X |
| 4,862,768 | 9/1984 | Iwatsuki et al. | 475/221 X |
| 5,071,396 | 12/1991 | Kobayashi | 475/249 |
| 5,080,641 | 1/1992 | Kobayashi | 475/249 |
| 5,098,351 | 3/1992 | Kobayashi | 475/249 |

FOREIGN PATENT DOCUMENTS

| | | | |
|---|---|---|---|
| 53-32466 | 9/1978 | Japan . | |
| 63-176728 | 7/1988 | Japan . | |
| 1421599 | 9/1988 | U.S.S.R. | 475/221 |
| 421889 | 12/1934 | United Kingdom | 475/248 |

OTHER PUBLICATIONS

Marks' Standard Handbook for Mechanical Engineers.

*Primary Examiner*—Rodney H. Bonck
*Assistant Examiner*—Ryan W. Massey
*Attorney, Agent, or Firm*—Martin A. Farber

[57] ABSTRACT

A complex central differential is provided for distributing the output of an automatic transmission to front and rear wheels of a motor vehicle. The complex central differential comprises a planetary gear device including a first sun gear operatively connected to an output shaft of the transmission, a carrier, first and second planetary pinions integral with each other and rotatably supported on the carrier, and a second sun gear, and a ring gear. The first planetary pinion is engaged with the first sun gear and with the ring gear, the second planetary pinion is engaged with the second sun gear. The carrier is operatively connected to either of the front wheels or the rear wheels and the second sun gear is operatively connected to the rear wheels. A brake is provided to prevent the ring gear from rotating when output speed of the transmission exceeds a predetermined speed in a first speed range of the transmission, thereby providing the lowest speed.

3 Claims, 10 Drawing Sheets

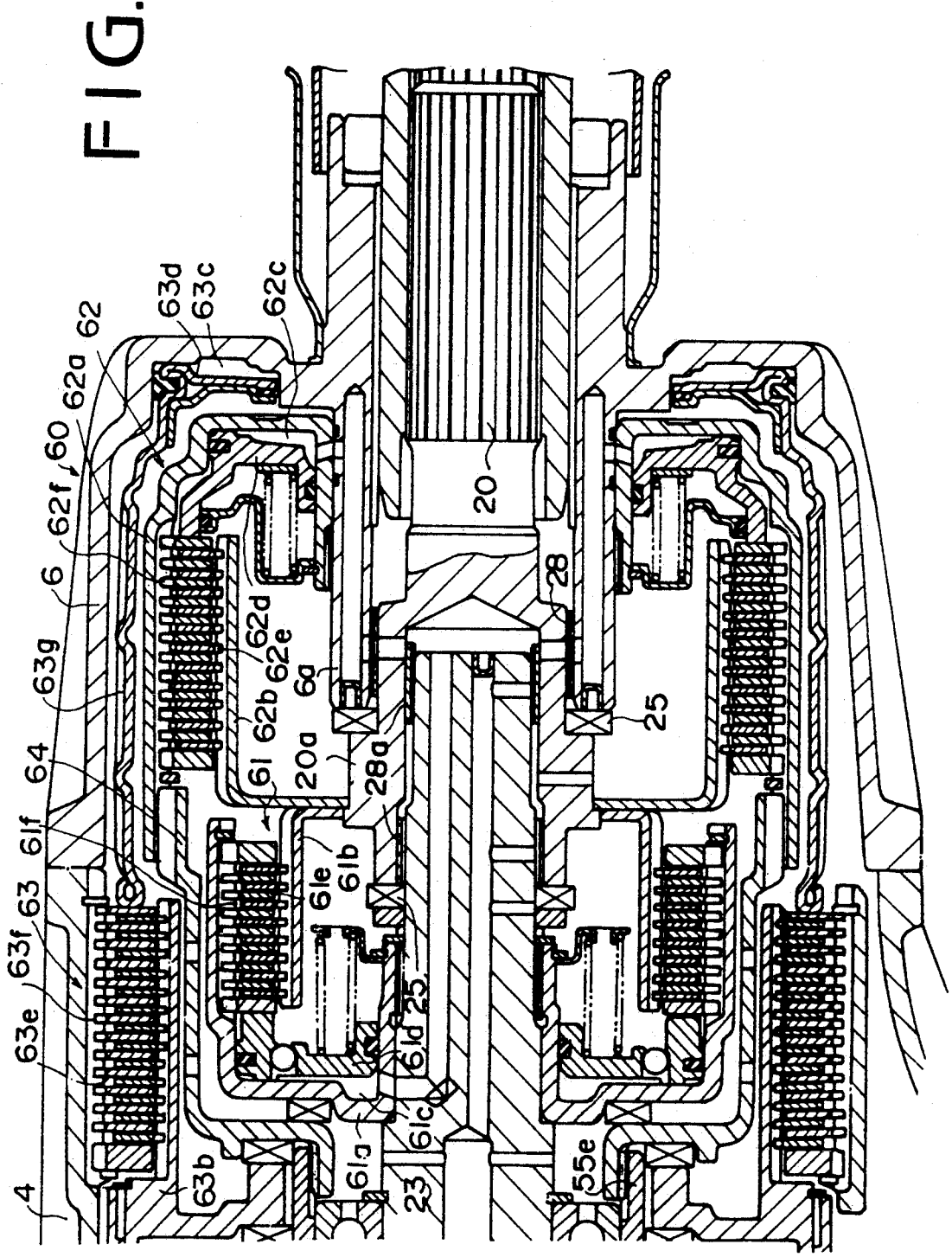

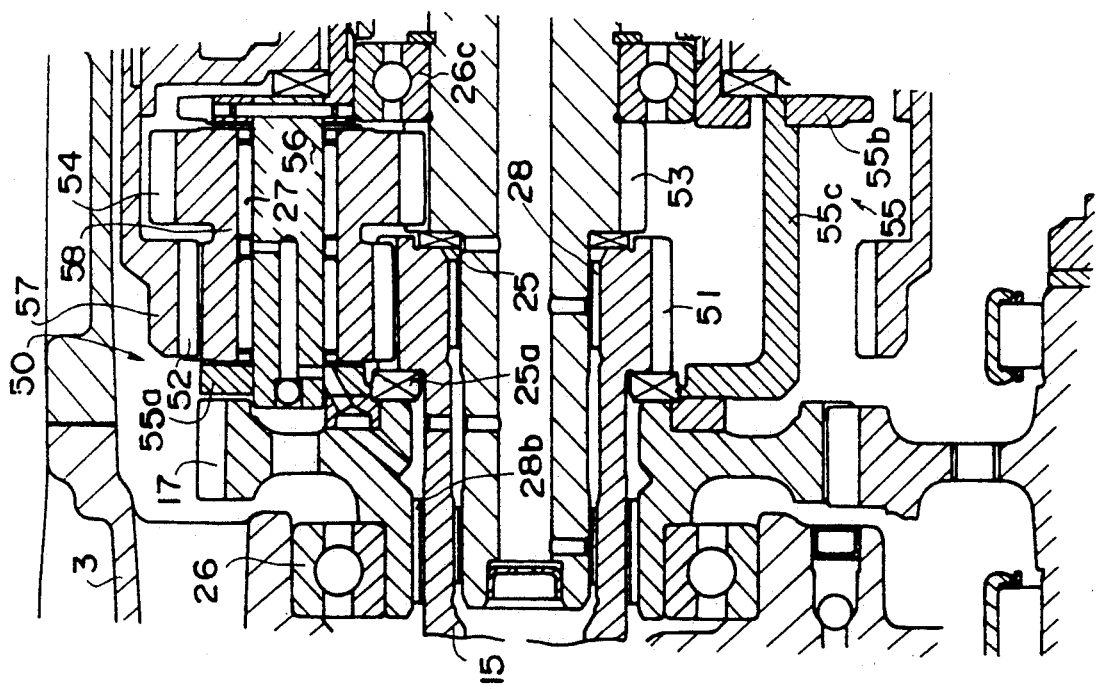

POWER TRANSMITTING SYSTEM FOR A FOUR-WHEEL DRIVE MOTOR VEHICLE

BACKGROUND OF THE INVENTION

The present invention relates to a system for transmitting power of an engine to four wheels of a motor vehicle having a central differential, and more particularly to the system which provides multiple operational ranges of the transmission.

In a conventional four-wheel drive motor vehicle having the central differential, the central differential comprising bevel gears or a planetary gear device is disposed in alignment with an output shaft of an automatic transmission. The automatic transmission is provided with a hydraulic control system and various sensors for detecting driving conditions of the motor vehicle. A fluid operated multiple-disk friction clutch is provided for controlling the central differential. Torque of the clutch is variably controlled in accordance with hydraulic pressure from the hydraulic control system or output signals from a microcomputer for controlling a torque split ratio between front wheels and rear wheels, thereby improving the engine power, driveability, stability at braking, and antilock brake operations.

Japanese Patent Application Laid-Open 63-176728 discloses a four-wheel drive motor vehicle in which a central differential comprising a simple planetary gear device is provided. An output of a transmission is transmitted to a carrier of the simple planetary gear device. The torque is split to front wheels through either of a sun gear or a ring gear and to rear wheels through the other. The torque to the front and rear wheels is unequally split at a ratio determined by the difference between pitch circles of the sun gear and the ring gear. A fluid operated multiple-disk friction clutch as a lock device is provided for controlling the differential operation.

Japanese Patent Publication 53-32466 discloses a power transmitting system for a motor vehicle. The system is provided with two sets of planetary gear devices for providing three forward speeds and one reverse speed of the transmission. A sub-transmitting system comprising complex planetary gear devices is provided for providing a fourth speed of an overdrive.

However, in the conventional systems, it is necessary to provide another sub-transmitting system for providing a further operational range having a larger gear ratio than that of the lowest speed. Consequently, the transmission becomes large in size.

SUMMARY OF THE INVENTION

The object of the present invention is to provide a power transmitting system in which the operational range of the transmission is increased without increasing the system size.

According to the present invention, there is provided a system for transmitting power of an engine to front wheels and rear wheels of a motor vehicle having an automatic transmission, a complex central differential for distributing the power of the engine to the front and rear wheels, the system comprising, the automatic transmission having a first speed range, a planetary gear device including a first sun gear operatively connected to an output shaft of the transmission, a carrier, first and second planetary pinions integral with each other and rotatably supported on the carrier, a second sun gear, and a ring gear, the first planetary pinion being engaged with the first sun gear, the second planetary pinion being engaged with the second sun gear, and the ring gear being engaged either of the first and second planetary pinions, the carrier being operatively connected to either of the front and rear wheels, the second sun gear being operatively connected to the other wheels.

Converting means is provided for converting the complex central differential to a simple central differential, and control means is provided for operating the converting means when output speed of the transmission exceeds a predetermined speed in the first speed range.

The complex central differential is provided to reduce speed inputted from the transmission when converted to the simple central differential, thereby providing the lowest speed.

In an aspect of the invention, the converting means is arranged to prevent the ring gear from rotating, and the converting means is a fluid operated brake for braking the ring gear.

The other objects and features of this invention will become understood from the following description with reference to the accompanying drawings.

BRIEF DESCRIPTION OF DRAWINGS

FIGS. 2a and 2b show an enlarged sectional view of a central differential and a fluid operated clutch device of the system;

DETAILED DESCRIPTION OF THE PREFERRED EMBODIMENTS

Figure 1:
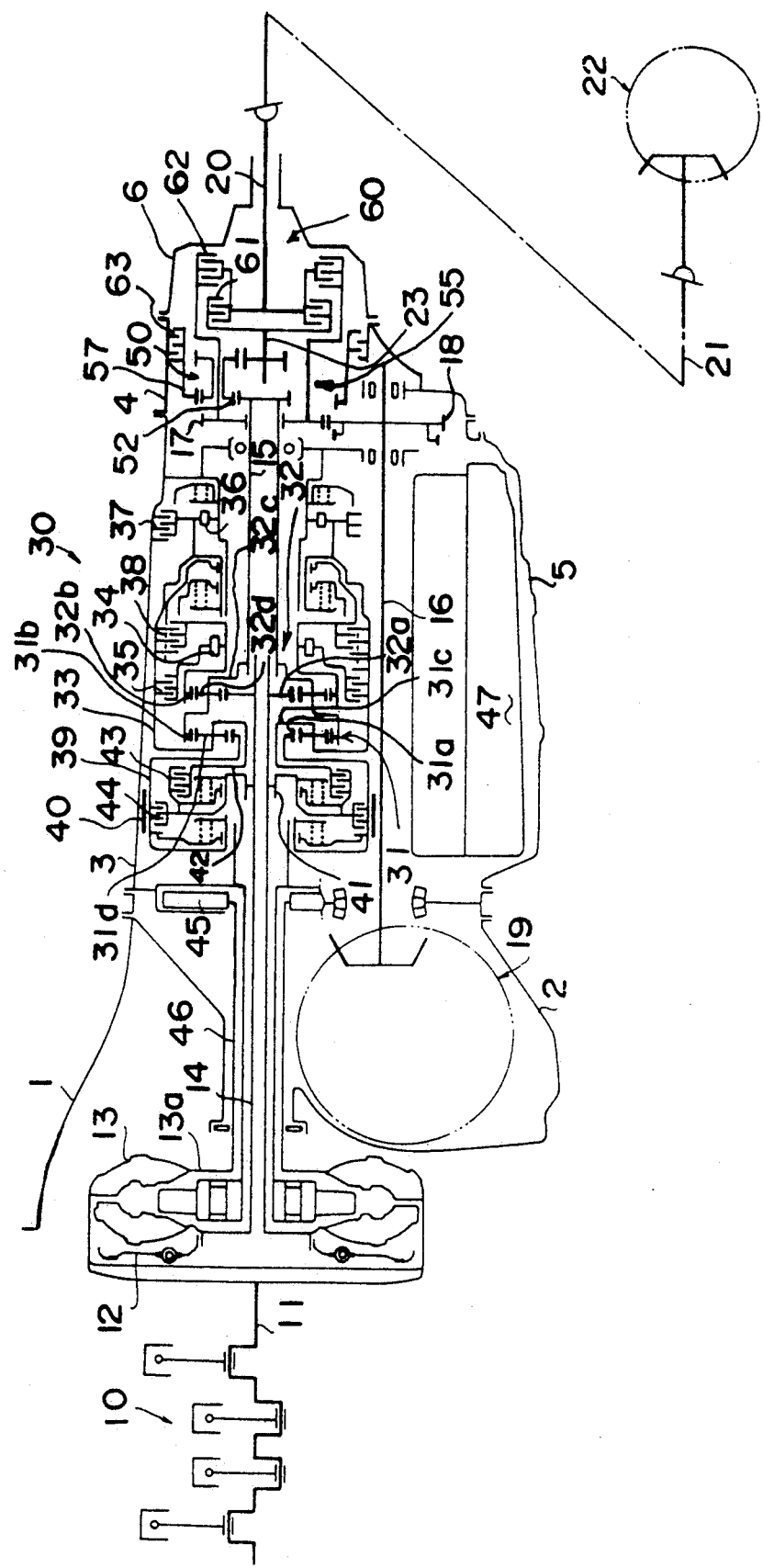
FIG. 1 shows a schematic diagram of a power transmission system for a four-wheel drive motor vehicle according to the present invention.

FIG. 1 shows a power transmission system in a transaxle type for a four-wheel drive motor vehicle having an engine 10 at a front portion thereof. The power transmission system has a torque converter 13 with a lockup clutch 12 mounted in a converter box 1, and a front differential 19 mounted in a differential box 2 behind the torque converter 13. A transmission case 3 housing an automatic transmission 30 is attached to a rear of the differential box 2. An oil pan 5 is attached to an underside of the transmission case 3. A crankshaft 11 of the engine 10 is operatively connected with the torque converter 13. An input shaft 14 extends from a turbine of the torque converter 13 to the automatic transmission 30. Output of the automatic transmission 30 is transmitted to an output shaft 15 which is aligned with the input shaft 14 for rearwardly transmitting the torque. The output shaft 15 is connected to a front drive shaft 16 which is parallelly disposed under the automatic transmission 30 through a pair of reduction gears 17 and 18 of a central differential 50 housed in a transfer case 4. A central differential control device 60 housed in an extension case 6 is disposed behind the central differential 50. The front drive shaft 16 is connected to front wheels through a front differential 19. The output shaft 15 is connected to a rear drive shaft 20 provided in the extension case 6 through the central differential 50 and the control device 60. The rear drive shaft 20 is connected to rear wheels through a propeller shaft 21 and a rear differential 22.

The automatic transmission 30 comprises two sets of single planetary gears consisting of a front planetary gear 31 and a rear planetary gear 32 for providing four forward speeds and one reverse speed. The front planetary gear 31 comprises a sun gear 31a, a pair of planet pinions 31d, a ring gear 31b, and a carrier 31c. The rear planetary gear 32 comprises a sun gear 32a, a pair of planet pinions 32d, a ring gear 32b, and a carrier 32c. The input shaft 14 is engaged with the rear sun gear 32a, and the front ring gear 31b and the rear carrier 32c are connected to the output shaft 15.

Between a connecting element 33 formed integral with the front carrier 31c and the rear ring gear 32b, a first one-way clutch 34 and a forward clutch 35 are disposed in series. A second one-way clutch 36 and a low and reverse brake 37 are disposed in parallel between the connecting element 33 and the transmission case 3. An overrunning clutch 38 is dispose between the connecting element 33 and the ring gear 32b. On a connecting element 39 integral with the sun gear 31a, a brake band 40 is provided. Between a connecting element 41 integral with the input shaft 14 and a connecting element 42 integral with the carrier 31c, a high clutch 43 is mounted. A reverse clutch 44 is provided between the connecting elements 39 and 41.

An oil pump 45 is provided in a front end of the transmission case 3. A pump drive shaft 46 is connected to an impeller 13a of the torque converter 13 and is operatively connected with a rotor of the oil pump 45.

In the oil pan 5, a control valve body 47 is provided for hydraulically actuating respective clutches and a brake of the transmission 30.

Referring to FIGS. 2a and 2b showing the central differential 50 and the control device 60, a first intermediate shaft 23 is rotatably mounted in the output shaft 15 at a front portion thereof through bushes 28 and a thrust washer 25. A rear portion of the intermediate shaft 23 is rotatably mounted on the rear drive shaft 20 through bushes 28a. The reduction gear 17 is rotatably mounted on the output shaft 15 through a bush 28b and a thrust bearing 25a. The reduction gear 17 and the output shaft 15 are mounted in the transmission case 3 through a ball bearing 26. The central differential 50 is disposed between the output shaft 15, reduction gear 17, and intermediate shaft 23.

The central differential 50 is a complex planetary gear device and comprises a first sun gear 51 formed on the output shaft 15, a first planetary pinion 52 meshed with the first sun gear 51, a second sun gear 53 formed on the intermediate shaft 23, a second planetary pinion 54 meshed with the second sun gear 53, and a carrier 55. The carrier 55 comprises a first carrier 55a and a second carrier 55b which are connected by a connecting member 55c. The first carrier 55a is mounted on the output shaft 15 and secured to the reduction gear 17. The first and second planetary pinions 52 and 54 are integral with one another to form a pinion member 58. The pinion member 58 is rotatably mounted on a shaft 56 through needle bearings 27. The shaft 56 is secured to the first carrier 55a and the second carrier 55b. A boss 55e of the carrier 55b formed at the rear end thereof is rotatably mounted on the intermediate shaft 23 through a ball bearing 26c.

Thus, the output torque from the output shaft 15 of the transmission 30 is transmitted to the carrier 55 and the second sun gear 53 through the first sun gear 51 and the pinions 52, 54 at predetermined respective torque split ratios. The difference between rotating speeds of the carrier 55 and the second sun gear 53 is absorbed by the rotation of the first and second planetary pinions 52 and 54.

The central differential 50 is further provided with a ring gear 57 engaged with the first planetary pinion 52 (or the second planetary pinion 54) for providing the largest reduction gear ratio.

Figure 3:
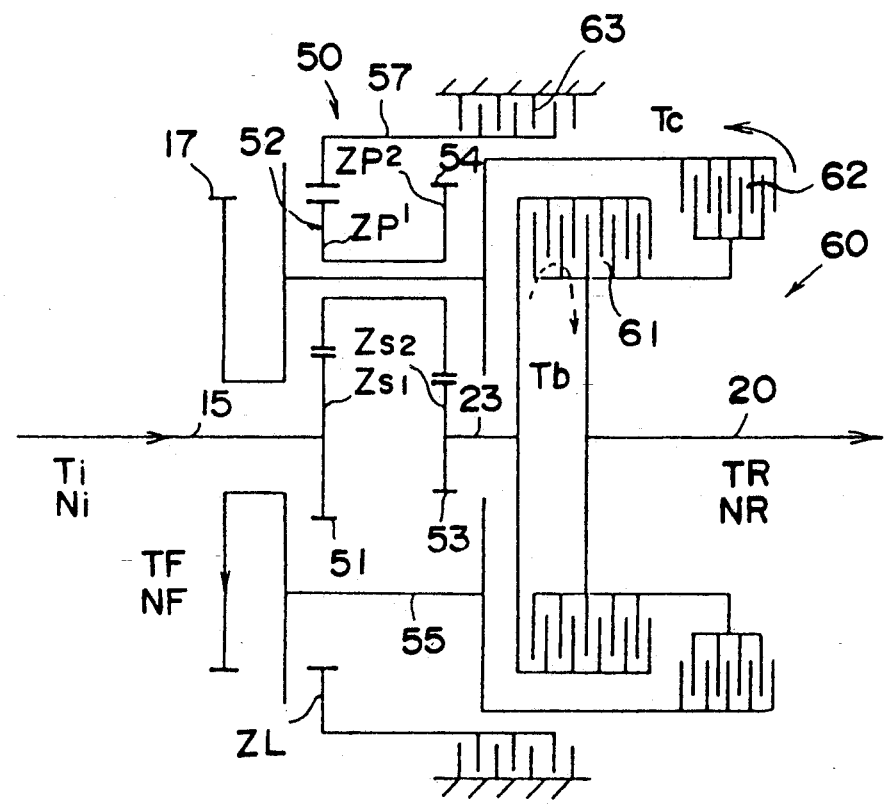
FIG. 3 is a schematic view showing the central differential and the clutch device.

The operation of the central differential 50 for distributing the torque to front wheels and rear wheels will be described hereinafter with reference to FIG. 3.

Input torque Ti of the first sun gear 51 and the relationship between the sun gears and pinions are expressed as follows, respectively.

$$Ti = T_F + T_R \quad (1)$$

$$rs_1 + rp_1 = rs_2 + rp_2 \quad (2)$$

where $T_F$ is the front torque transmitted from the carrier 55 to the front drive shaft 16, $T_R$ is the rear torque transmitted from the second sun gear 53 to the rear drive shaft 20, $rs_1$ is the radius of the pitch circle of the first sun gear 51, $rp_1$ and $rp_2$ are radii of pitch circles of first and second pinions 52 and 54, respectively, and $rs_2$ is the radius of the pitch circle of the second sun gear 53.

A tangential load P on the engaging point of the first sun gear 51 and the first pinion 52 is equal to the sum of a tangential load $P_1$ on the carrier 55 and a tangential load $P_2$ on the engaging point of the second sun gear 53 and the second pinion 54. That is, $$P = Ti/rs_1$$

$$P_1 = T_F/(rs_1 + rp_1)$$

$$P_2 = T_R/rs_2$$

$$Ti/rs_1 = \{(T_F/(rs_1 + rp_1)\} + T_R/rs_2 \quad (3)$$

Substituting equations (1) and (2) for the equation (3), $$T_F = (1 - rp_1 \cdot rs_2/rs_1 \cdot rp_2) \times Ti$$

$$T_R = (rp_1 \cdot rs_2/rs_1 \cdot rp_2) \times Ti$$

Consequently, it will be seen that the standard torque distribution for the front torque $T_F$ and the rear torque $T_R$ can be set to various values by changing the radii of the pitch circles of sun gears 51 and 53 and pinions 52 and 54.

Here, radii $rs_1$, $rp_1$, $rp_2$ and $rs_2$ of the first sun gear 51, first and second pinions 52, 54 and second sun gear 53 can be replaced with the respective numbers of the teeth $Zs_1$, $Zp_1$, $Zp_2$, and $Zs_2$. If $Zp_1 = Zp_2 = 18$, $Zs_1 = 27$, and $Zs_2 = 18$, the torque distribution ratio of the front wheels and the rear wheels is $$T_F : T_R = 40:60$$

A large torque can be distributed to the rear wheels.

The control device 60 in the extension case 6 comprises first and second fluid operated multiple-disk friction clutches 61 and 62 for changing the standard torque split ratios to the front and the rear wheels, and a lowest speed brake 63 as a brake for arresting the operation of the central differential 50. The first clutch 61 is provided between the intermediate shaft 23 and the rear drive shaft 20, and comprises a drive drum 61a secured to the intermediated shaft 23 and a driven drum 61b secured to the hub 20a of the rear drive shaft 20. A plurality of drive disks 61f are splined on the drive drum 61a and a plurality of driven disks 61e are splined on the driven drum 61b, disposed alternately with the disks 61f. A ring piston 61d is slidably mounted on the inner wall of the drive drum 61a. An oil chamber 61c is defined between the piston 61d and the drive drum 61a.

When the oil is supplied to the oil chamber 61c, the disks 61e and 61f are engaged to engage the clutch 61.

The second clutch 62 comprises a drive drum 62a rotatably mounted on a boss 6a of the extension case 6 formed at the inner portion thereof. The inner end of the drum 62a is splined on a connecting member 64 at an end portion thereof. The other end portion of the connecting member 64 is secured to the boss 55e of the second carrier 55b of the carrier 55. A driven drum 62b is secured to a hub 20a of the rear drive shaft 20. A plurality of drive disks 62f are splined on the drive drum 62a and a plurality of driven disks 62e are splined on the driven drum 62b, disposed alternately with the disks 62f. A ring piston 62d is slidably mounted on the inner wall of the drive drum 62a. The piston 62d engages with the end disks 62f. An oil chamber 62c is defined between the piston 62d and the drive drum 62a. When the oil is supplied to the chamber 62c, the piston 62d is pushed by the pressure of the oil. Thus, the disks 62f and 62e are engaged with the adjacent disks to engage the clutch 62 for producing a clutch torque.

The lowest speed brake 63 has a drum 63b which is rotatably mounted on the hub 55e of the second carrier 55b and connected to the ring gear 57. A plurality of disks 63e splined on the drum 63b are alternately arranged with a plurality of disks 63f which are splined on the inner periphery of the transfer case 4. A piston 63d is slidably mounted on an inner wall of the extension case 6. An oil chamber 63c is formed between the piston 63d and the extension case 6. A pressing member 63g secured to the piston 63d is engaged with the end disk 63f.

When oil is supplied to the chamber 63c, the piston 63d is pushed by the pressure of the oil. The piston 63d pushes the disks 63f and 63e through the pressing member 63g to effect the brake 63, thereby locking ring gear 57 through the drum 63b.

The clutches 61 and 62 and the brake 63 are hydraulically controlled by the operation of the system in the control valve body 47.

The operation of the automatic transmission 30 for providing the four forward speeds and one reverse speed will be described hereinafter.

In a first speed of a drive range or the first speed of a "2" or "3" range, the forward clutch 35 is engaged. When the vehicle is accelerated, the ring gear 32b is fixed together with the connecting element 33 by engagement of one-way clutches 34 and 36. Thus, the output of the input shaft 14 is transmitted to the output shaft 15 through the sun gear 32a and the carrier 32c. At coasting of the vehicle, the one-way clutches 34 and 36 become free. Accordingly, regardless of the engagement of the overrunning clutch 38, the rotation of output shaft 14 is not transmitted to the engine, so that the engine braking does not effect.

In a "1" range 1st speed, the low and reverse brake 37 and overrunning clutch 38 are engaged, so that the ring gear 32b is always locked to effect the engine brake.

In a drive range 2nd speed or a "2" or "3" range 2nd speed, the forward clutch 35 and the brake band 40 are engaged to lock the sun gear 31a. The rotation of carrier 31c is transferred to the ring gear 32b through the connecting element 33, forward clutch 35, and one-way clutch 34, increased in speed. When the vehicle is decelerated, the overrunning clutch 38 is engaged to hold the engagement of the connecting element 33 with the ring gear 32b. Thus, the rotation of the output shaft 15 is transmitted to the engine to effect the engine brake.

In a drive range 3rd speed or a "3" range 3rd speed, the forward clutch 35 and the high clutch 43 are engaged, so that the input shaft 14 is coupled with the ring gear 32b by the high clutch 43 through the connecting elements 41, 42, carrier 31c, connecting element 33, forward clutch 35, and one-way clutch 34. Accordingly, the rear planetary gear 32 is integrated as one unit to directly connect the input shaft 14 with the output shaft 15. At deceleration, the overrunning clutch 38 is engaged for restricting the one-way clutch 34, thereby effecting the engine brake.

In a drive range 4th speed, in addition to the drive or "3" range 3rd speed operation, the brake band 40 clamps the sun gear 31a. The ring gear 31b is rotated at higher speed and the rotation is transferred to the output shaft 15. In this range, since the rotation is transmitted without one-way clutches 34, 36, the engine brake is always effected.

In reverse range (R), the reverse clutch 44 is engaged. The input shaft 14 drives the sun gear 31a. The carrier 31c is fixed together with the connecting element 33 by the engagement of the low and reverse brake 37. The ring gear 31b in the front planetary gear 31 rotates in the reverse direction to drive the output shaft 15 at a large gear ratio, for providing the reverse speed.

During the aforementioned operations, the brake 63 for the lowest speed is released. The clutch 61 is engaged to provide the four-wheel drive system. The clutch 62 is engaged to produce a clutch torque for restricting the differential operation corresponding to the slipping of the front wheels and rear wheels.

In the lowest speed of the drive range, the brake 63 is engaged to lock the ring gear 57, so that the complex planetary gear device becomes a simple planetary gear device comprising the sun gear 51, planetary pinion 52 and the ring gear 57, thereby providing the lowest speed. In this state, if the gear ratio obtained by the central differential 50 is insufficient, the transmission 30 is shifted to the second speed.

If a gear ratio of the second speed is $i_2$ and a gear ratio obtained by the central differential 50 is $i_p$, a gear ratio of the fifth speed $i_{EL}$ is represented as $$i_{EL} = i_2 \cdot i_p$$

In accordance with the aforementioned conditions of gears and pinions of the central differential 50, if $Z_L = 63$, the gear ratio ip is ip = 1 + (63/27) = 3.333. If $i_2$ is 1.545, $i_{EL}$ becomes 5.149. Thus, the gear ratio which is larger than that of the first speed is obtained at a proper gear ratio interval. The hydraulic pressure of the clutch 62 is controlled corresponding to the driving conditions of the engine and the conditions on the road surface for producing a necessary transmitting torque.

Thus, the four-wheel drive system is established with a torque split control system.

The operations of clutches and brakes of the transmission 30 and the control device 60 in relation to the shift ranges are shown in the table 1.

TABLE 1

| RANGES | CLUTCHES, BRAKES | | | | | | | | | | |
|---|---|---|---|---|---|---|---|---|---|---|---|
|  | 44 | 40 | 43 | 35 | 34 | 38 | 37 | 36 | 63 | 61 | 62 |
| D RANGE |  |  |  |  |  |  |  |  |  |  |  |
| LOWEST SPEED | O |  | O | O |  |  |  |  |  | O | ⊙ |
| 1ST SPEED |  |  | O | O |  |  |  | O |  | O | O |
| 2ND SPEED |  | O | O | O |  |  |  |  |  | O | O |
| 3RD SPEED |  |  | O | O | O |  |  |  |  | O | O |
| 4TH SPEED |  | O | O |  | O |  |  |  |  | O | O |
| REVERSE | O |  |  |  |  |  | O |  |  | O | O |

In the table 1, marks show engagements of clutches and brake, marks ○ show clutch torque produced in the clutch 62 for restricting the differential operation, and a mark ⊙ shows the transmitting torque for controlling the split of torque to front and rear wheels.

The table 2 shows gear ratios, examples of gear ratio distribution ratios in relation to the shift ranges.

TABLE 2

| | GEAR RATIO | EXAMPLES | STANDARD TORQUE SPLIT RATIO TF/TR |
|---|---|---|---|
| LOWEST SPEED | $i5 = i2 \cdot ip$ | 5.149 | POWER DISTRIBUTION BY CLUTCH |
| 1ST SPEED | $i1 = 1 + (1/\alpha 2)$ | 2.785 | 40/60 |
| 2ND SPEED | $i2 = (\alpha 1 + \alpha 2 + \alpha 1 \cdot \alpha 2)/(1 + \alpha 1)\alpha 2$ | 1.545 | " |
| 3RD SPEED | $i3 = (1 + \alpha 2)/(1 + \alpha 2)$ | 1.000 | " |
| 4TH SPEED | $iEL = 1/(1 + \alpha 1)$ | 0.694 | " |
| REVERSE | $iR = 1/\alpha 1$ | 2.272 | 40/60 |

In the table 2, $\alpha_1$ is a gear ratio of the number of the teeth $Zfs_1$ of the sun gear 31a to the number of the teeth $ZR_1$ of the ring gear 31b of the front planetary gear 31 obtained by $\alpha_1 = Zfs_1/ZR_1$, and $\alpha_2$ is a gear ratio of the number of the teeth $Zrs_2$ of the sun gear 32a to the number of the teeth $ZR_2$ of the ring gear 32b of the rear planetary gear 32 obtained by $\alpha_2 = Zrs_2/ZR_2$.

If rotating speeds of ring gear 31b, sun gear 31a and carrier 31c of the front planetary gear 31 are $NR_1$, $Ns_1$, $Nc_1$, respectively, the relationship between the rotating speeds of each element of the front planetary gear 31 is represented by an equation as follows.

$$NR_1 + \alpha_1 \cdot Ns_1 = (1 + \alpha_1) \cdot Nc_1$$

where $\alpha_1 = Zfs_1/ZR_1$. If rotating speed of ring gear 32b, sun gear 32a and carrier 32c of the rear planetary gear 32 are $NR_2$, $Ns_2$, and $Nc_2$, respectively, the relationship between the rotating speeds of each element of the rear planetary gear 32 is represented by an equation as follows.

$$NR_2 + \alpha_2 \cdot Ns_2 = (1 + \alpha_2) \cdot Nc_2$$

where $\alpha_2 = Zrs_2/ZR_2$.

Describing the operation of the system, the power of the engine 10 is transmitted through the torque converter 13 and the input shaft 14 to the transmission 30. Accordingly, front and rear planetary gears 31 and 32 are operated and clutches 44, 43, 35, 38, 36, 34 and brakes 40, 37 are selectively actuated, so that the four forward speeds and one reverse speed are provided as described hereinbefore. The output of the transmission 30 is transmitted to the first sun gear 51 of the central differential 50.

In order to stably drive the vehicle on roads in general, the second clutch 61 is engaged, thereby connecting the second sun gear 53 of the central differential 50 with the rear drive shaft 20 through the intermediate shaft 23 and the clutch 61. Thus, the first mode, wherein the torque is distributed in accordance with the first standard torque split ratio is selected. Namely, the standard torque split ratio is determined $T_F: T_R = 40:60$, dependent on the number of the teeth of the first and second sun gear 51, 53 and the pinions 52, 54. Thus, 40% of the output torque of the transmission 30 is transmitted to the front wheels through the carrier 55, the reduction gears 17, 18, the first drive shaft 16 and the front differential 19. Meanwhile, 60% of the torque is transmitted to the rear wheels through the second sun gear 53, intermediate shaft 23, second clutch 61, the rear drive shaft 20, the propeller shaft 21 and the rear differential 22. Thus, the four-wheel driving is established. The vehicle is in an oversteering condition so that good cornering maneuverability, driveability and steerability are obtained.

When the vehicle makes a turn, the rotating difference in speeds of the front and rear wheels is sufficiently absorbed by the first and second pinions 52, 54 of the central differential 50, thereby preventing the tight corner braking and ensuring good operability.

If the vehicle is driven on a slippery road, the rear wheels slip first because the large amount of the torque is distributed to the rear wheels. Thus, the first clutch 62 is engaged at the clutch pressure. Consequently, the clutch torque Tc is produced in the clutch 62. The clutch 62 is provided in parallel with the carrier 55 and the second sun gear 53 of the central differential 50 through the connecting member 64. Accordingly, the clutch torque Tc corresponding to the slip ratio is transmitted from the second sun gear 53 to the carrier 55 to increase the torque to the front wheels. To the contrary, the torque to the rear wheels is reduced to eliminate slipping, thereby improving driveability to ensure good operability and safe driving.

When the differential operation restricting torque becomes maximum, the carrier 55 is directly engaged with the second sun gear 53 to lock the central differential 50. Thus, the four-wheel driving is established in accordance with the torque split corresponding to the axle loads of the front and rear wheels. Thus, the torque split is continuously controlled in accordance with the slip condition for preventing the slipping of the four wheels.

If the vehicle is running on a steep-inclined road or on a very rough road, a driver operates the shift lever to the lowest speed range or the maximum torque range is automatically selected in accordance with the sensor signal. Therefore, the transmission is shifted to the second speed and the brake 63 is engaged so that the ring gear 57 of the central differential 50 is locked. Thus, a simple planetary gear device is formed for providing the lowest speed. Consequently, the second speed of the transmission is largely reduced in accordance with the central differential 50. The power is transmitted to the front wheels through the carrier 55. Thus, the vehicle can be driven at the lowest speed having a larger gear ratio than the first speed.

On the other hand, the transmitting torque TD in the clutch 62 is variably controlled corresponding to the driving conditions and the slipping of the front wheels. The torque is transmitted to the rear wheels through the carrier 55, first intermediate shaft 23 and clutch 62. Thus, the four-wheel drive system is provided.

The vehicle is driven in an understeering condition so that the stability of the vehicle at a high speed driving is improved. The torque is transmitted to the rear wheels corresponding to the transmitting torque TD. Therefore, the slipping of the wheels is prevented.

Figure 4A:
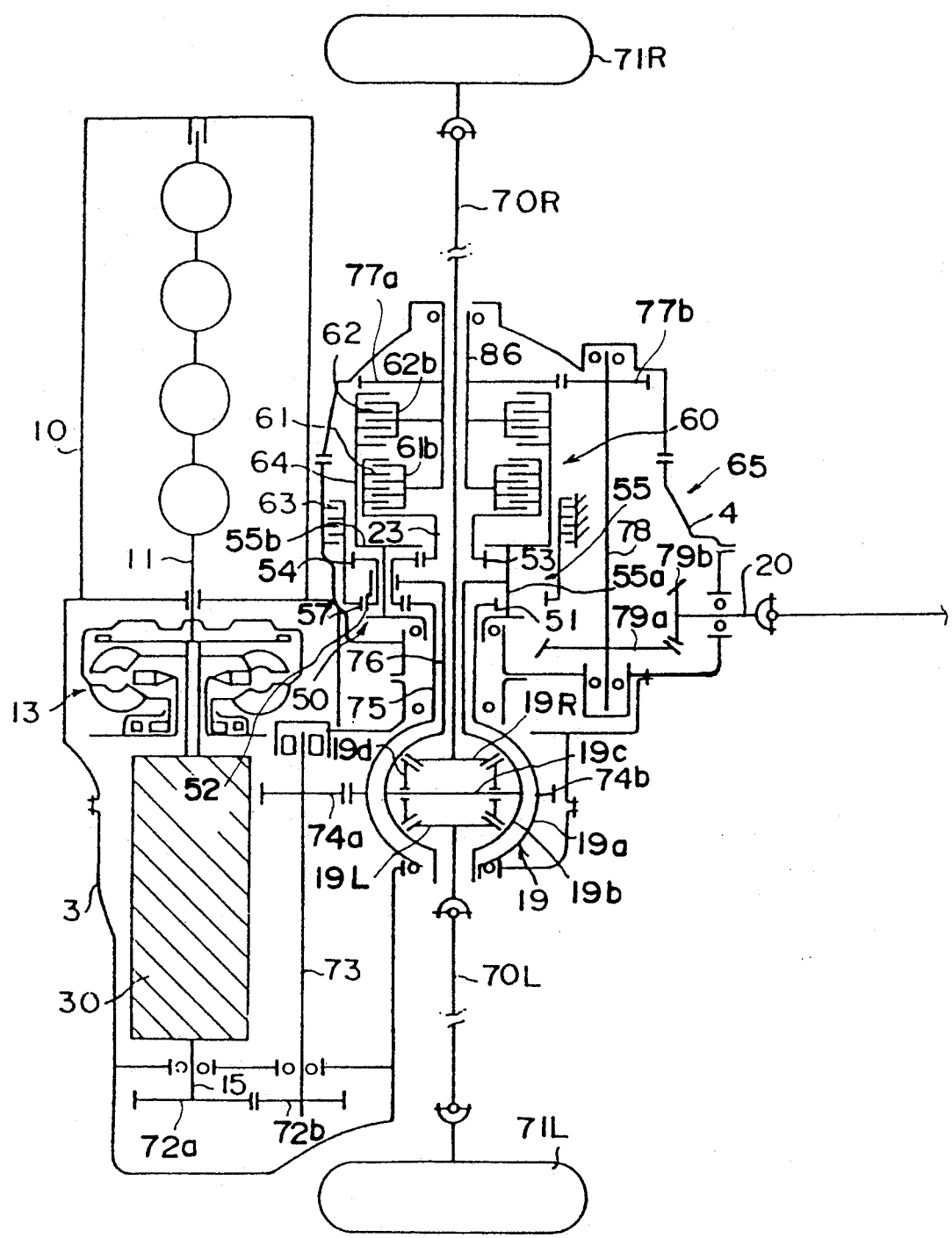
FIGS. 4a and 4b show a schematic diagram of a power transmission system of a second embodiment of the present invention.
Figure 4B:
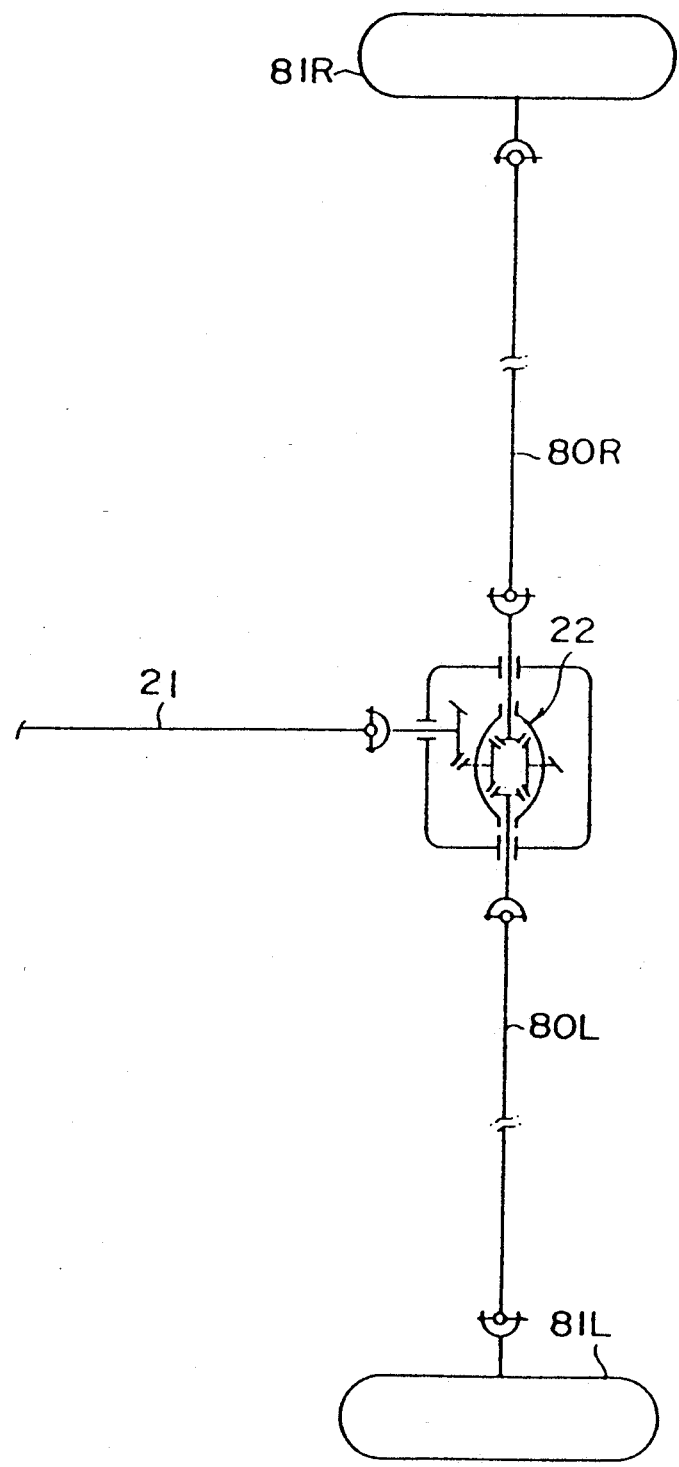

FIG. 4 shows a power transmission system of the second embodiment in which the engine 10 is laterally mounted on the motor vehicle at a front portion of the motor vehicle. The torque converter 13 connected to the engine 10 through the crankshaft 11 and the automatic transmission 30 are laterally mounted on the motor vehicle. The front axle differential 19 is housed in the transmission case 3, and a transfer device 65, the central differential 50 and the central differential control device 60 are housed in the transfer case 4. The output shaft 15 of the transmission 30 is connected to an intermediated shaft 73 which is parallel with the output shaft 15, through a pair of gears 72a and 72b.

A drive gear 74a fixedly mounted on the intermediated shaft 73 meshes with a final gear 74b which is fixed to opposed hub members 19a. The front axle differential 19 with a bevel gear has a differential case 19b connected to a first tubular output shaft 76 of the central differential 50. In the differential case 19b, there are provided a pinion shaft 19c secured to the differential case 19b, two differential pinions 19d rotatably mounted on the pinion shaft 19c and two bevel side gears 19L, 19R meshed with pinions 19d. The side gears 19L and 19R are connected to left and right front axles 70L and 70R so as to respectively transmit the output power of the transmission to the left and right front wheels 71L and 71R.

In the transfer case 4, the central differential 50 and the control device 60 are provided coaxially with the front differential 19 and the axle 70R, and the transfer device 65 is disposed behind the central differential 50.

The central differential 50 has a tubular input shaft 75 connected with the hub member 19a, and the output shaft 76 connected to the connecting member 55c of the carrier 55. The first output shaft 76, intermediated shaft 23, and a second tubular output shaft 86 are rotatably mounted on the right front axle 70R. The drums 61b and 62b of the clutches 61 and 62 of the control device 60 are securely mounted on the shaft 86.

The central differential 50 comprises first sun gear 51 integrally formed on the input shaft 75, first planetary pinion 52 meshed with the first sun gear 51, second sun gear 53 integrally formed on the intermediate shaft 23, second planetary pinion 54 meshed with the second sun gear 53, and carrier 55. The first carrier 55a and the second carrier 55b are rotatably mounted on the input shaft 75 and the intermediated shaft 23, respectively.

Thus, the output torque from the output shaft 15 of the transmission 30 is transmitted to the first sun gear 51 through the drive gear 74a, the final gear 74b, the hub member 19a and the input shaft 75 and further to the carrier 55 and the second sun gear 53 through the pinions 52, 54 at predetermined respective torque distribution ratios. The output torque from the carrier 55 is transmitted to the front differential 19 through the first output shaft 76 and the differential case 19b. The carrier 55 is further connected to the clutch 62 through the second carrier 55b and the connecting member 64.

The construction and operation of the control device 60 are the same as those of the first embodiment.

A transfer drive gear 77a of the transfer device 65 is securely mounted on the second output shaft 86. The transfer drive gear 77a engages with a driven gear 77b securely mounted on a transfer shaft 78 of the transfer device 65 which is disposed behind the central differential 50. The transfer shaft 78 is connected to the rear drive shaft 20 perpendicular to the transfer shaft 78 through a pair of bevel gears 79a, 79b, thereby transmitting the power to rear axles 80L and 80R connected to the left and right rear wheels 81L and 81R by way of the rear drive shaft 20, propeller shaft 21 and rear differential 22.

Describing the operation of the system, the power of the engine 10 is transmitted through the torque converter 13 to the automatic transmission 30 at which the transmission ratio is controlled. The output of the transmission is transmitted to the first sun gear 51 of the central differential 50 through the output shaft 15, the gears 72a, 72b, the intermediate shaft 73, the drive gear 74a, the final gear 74b, the hub members 19a and the input shaft 75. The torque of the carrier 55 is transmitted to the front wheels 71L, 71R through the first output shaft 76, the front differential 19 and the axles 70L and 70R. The torque is transmitted to the rear wheels 81L, 81R through the second sun gear 53, the intermediate shaft 23, the clutch 61, the second output shaft 86, the transfer drive and driven gears 77a and 77b, the transfer shaft 78, the bevel gears 79a and 79b, the rear drive shaft 20, the propeller shaft 21, the rear differential 22 and the rear axles 80L and 80R. Thus, a full-time four-wheel driving is established.

Accordingly, in the same manner as the first embodiment, the differential operation is restricted by the multiple-disk friction clutch 62 and the operational range of the transmission is shifted to the lowest speed by the engagement of the clutch 62 and the brake 63.

Figure 5A:
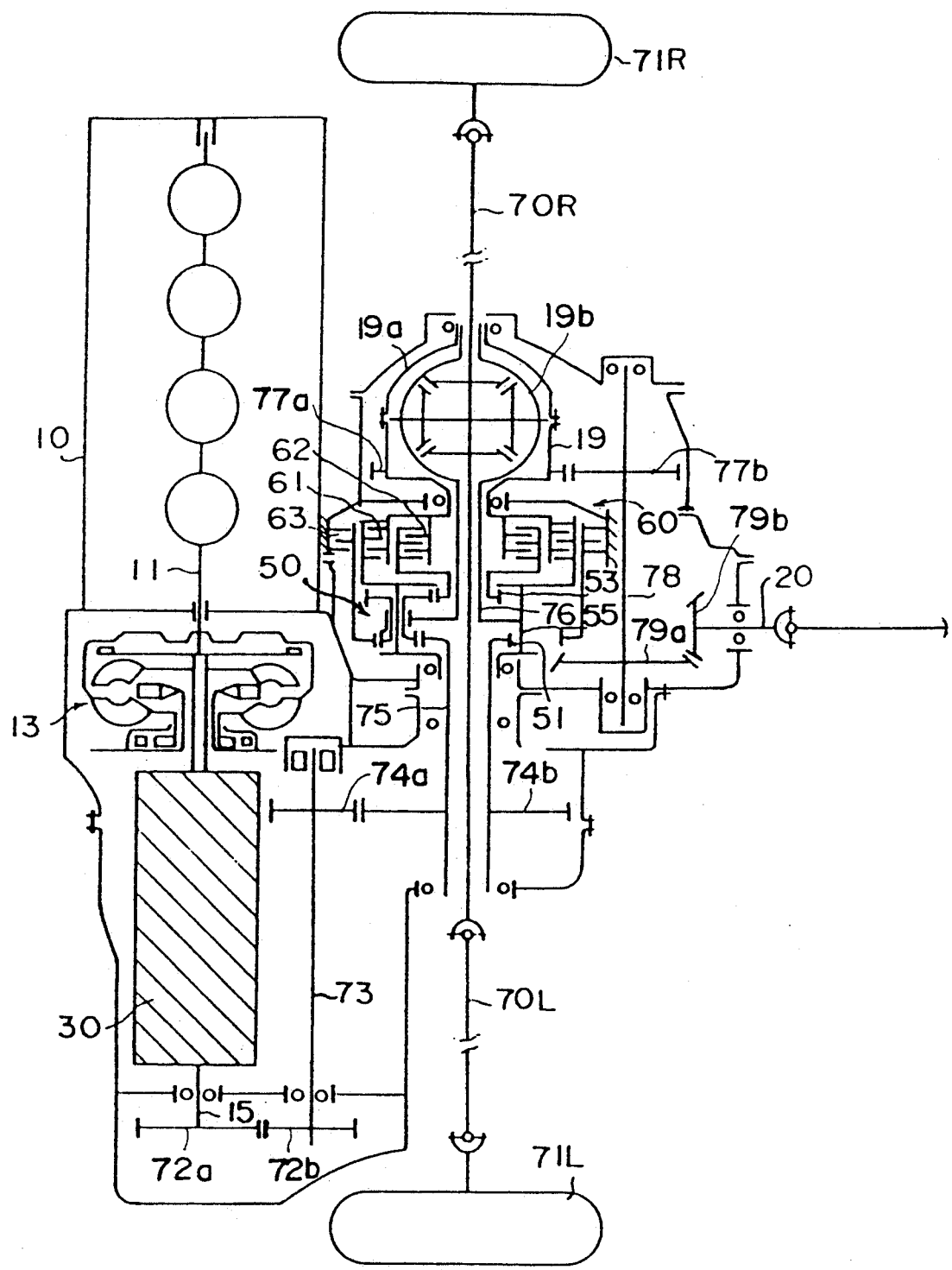
FIGS. 5a and 5b show a schematic diagram of a modification of the second embodiment.
Figure 5B:
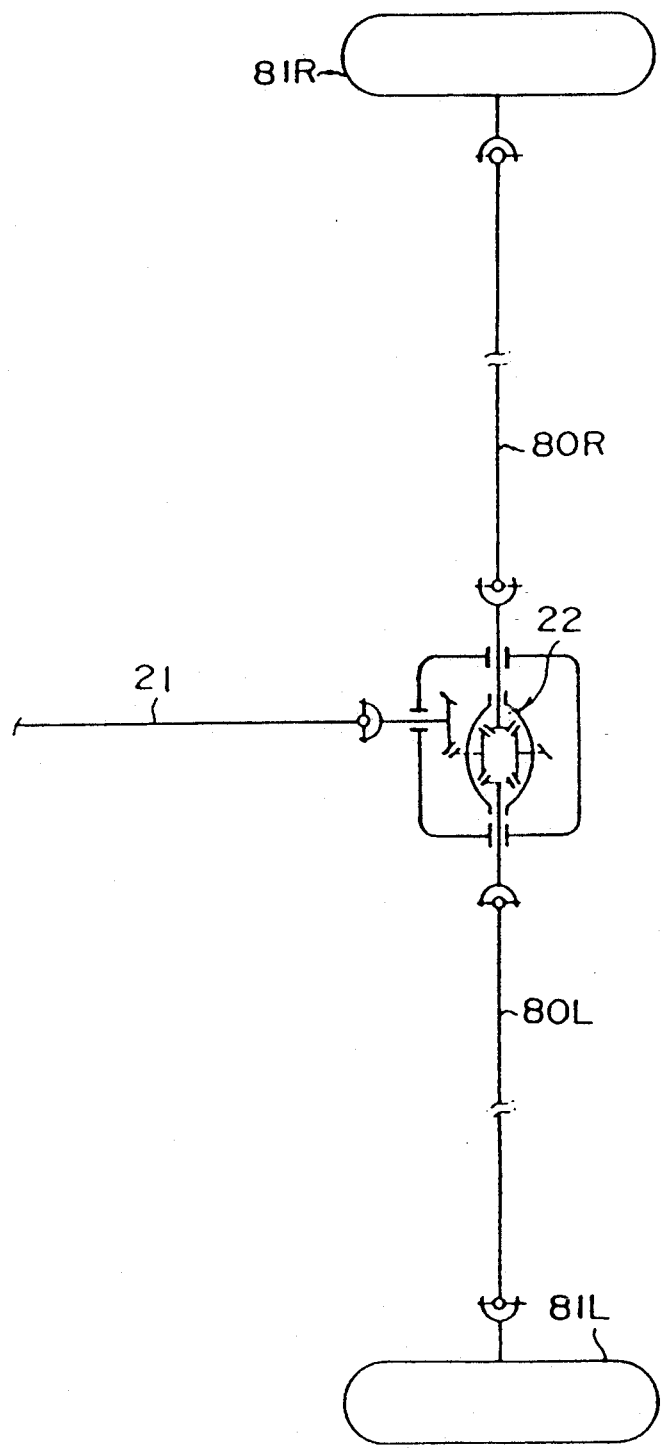

FIG. 5 shows a modification of the second embodiment of the present invention. In the modification, the front differential 19 is disposed adjacent the control device 60 at the same side as the engine 10. The central differential 50 is coaxially provided with the front differential 19 on the right axle 70R behind the engine 10. The final gear 74b is securely mounted on the input shaft 75 which is rotatably mounted on the right axle 70R. The first output shaft 76 supporting the carrier 55 is connected to the differential case 19b of the front differential 19. The transfer drive gear 77a is securely mounted on the hub member 19a. Other construction and operation of the modification are the same as those of the second embodiment.

Figure 6A:
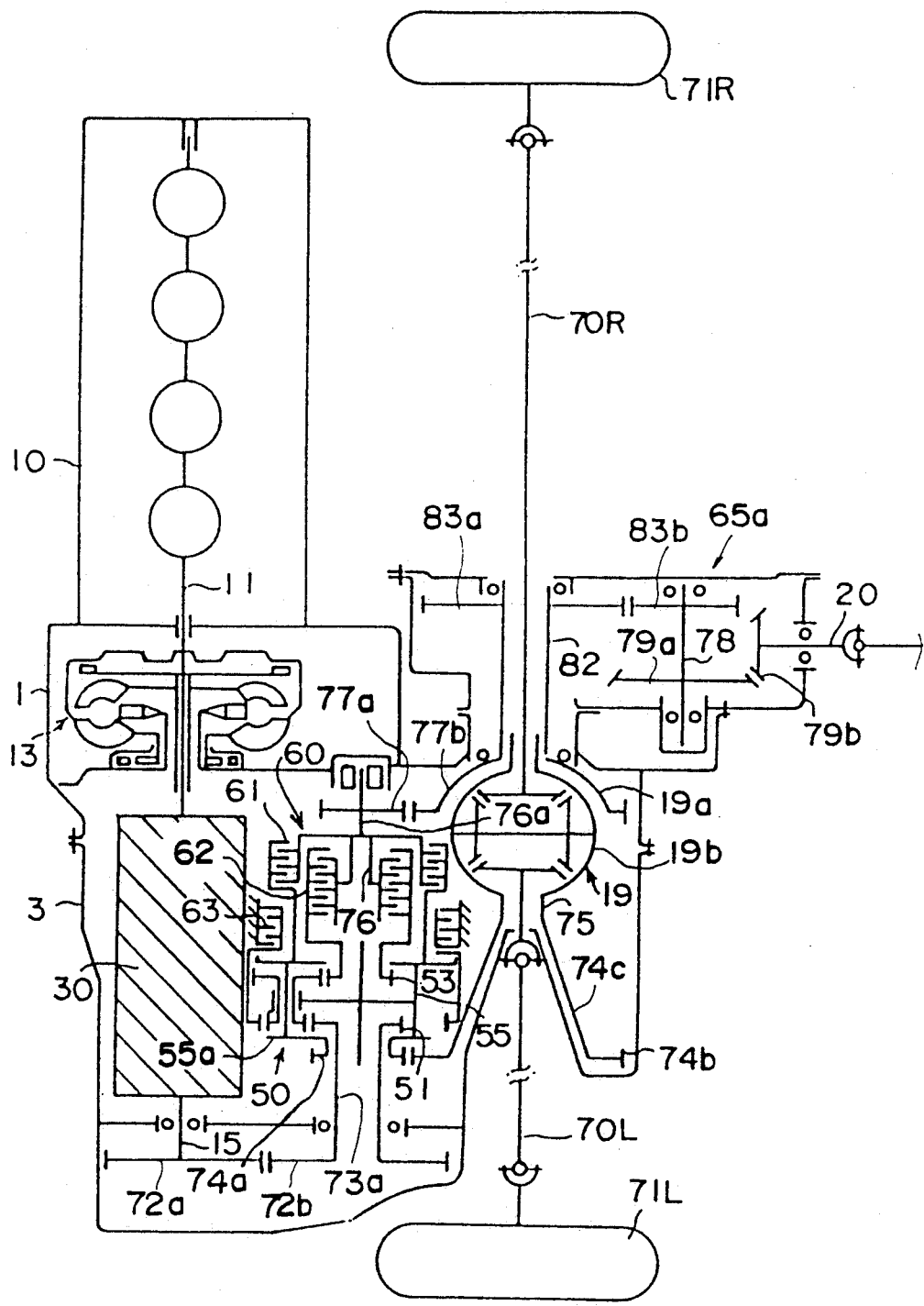
FIGS. 6a and 6b show a schematic diagram of a further modification of the second embodiment.
Figure 6B:
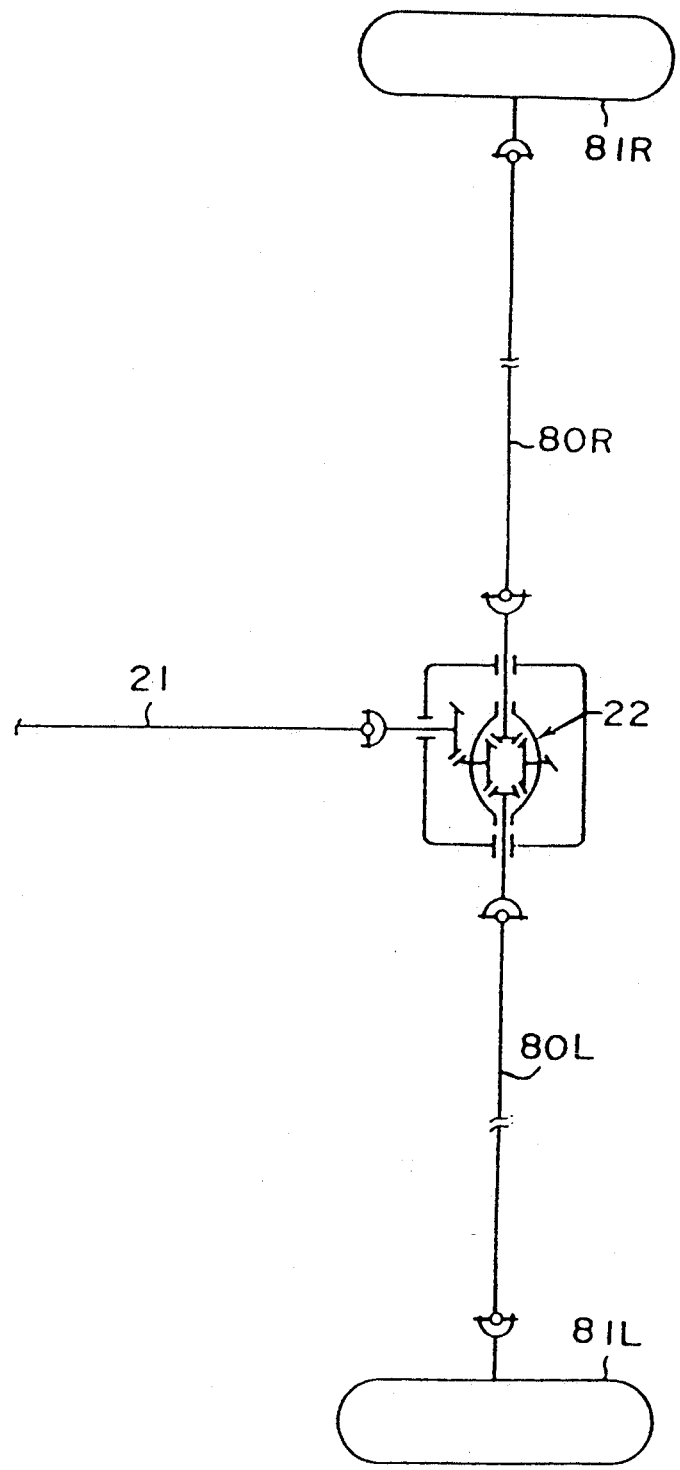

Referring to FIG. 6 showing a further modification of the second embodiment, the central differential 50 and the control device 60 are disposed in the transmission case 3 directly behind the automatic transmission 30. The tubular output shaft 76 is coaxially disposed with a tubular intermediate shaft 73a. The gear 72b meshed with the gear 72a is integrally mounted on the tubular intermediate shaft 73a. The first sun gear 51 of the central differential 50 is integrally formed on the tubular intermediate shaft 73a. The drive gear 74a mounted on the intermediate shaft 73a is integrally formed on the first carrier 55a of the carrier 55. The final gear 74b meshed with the drive gear 74a is mounted on the tubular input shaft 75 through a boss 74c. The tubular input shaft 75 is secured to the differential case 19b of the front differential 19.

The fluid operated clutch 62 mounted on the output shaft 76 is connected to an output shaft 76a through a flange portion of the clutch 61. The transfer drive gear 77a of a transfer device 65a is securely mounted on the shaft 76a. The transfer driven gear 77b meshed with the drive gear 77a is secured to the hub member 19b. A tubular shaft 82 is secured to the hub member 19a and rotatably mounted on the right axle 70R. A gear 83a is securely mounted on the tubular shaft 82. A gear 83b securely mounted on the transfer shaft 78 meshes with the gear 83a.

In this modification, the power train disposed in the transfer case in simplified.

In accordance with the present invention, the central differential for distributing torque to front and rear wheels is effectively used for a lowest speed gear to provide five forward speeds of the transmission. Since the number of the operational ranges of the transmission is increased, the power and fuel consumption of the engine are increased.

The lowest speed range is obtained without changing the power train such as the automatic transmission, the central differential and the control device. Thus, the system is compact in size and simplified in construction.

During the operation of the selected range of the transmission, the torque distribution is controlled by the central differential having the differential operation restricting system. During the operation of the lowest speed range, the torque distribution is controlled by the differential operation restricting system.

Since the central differential comprises a complex planetary gear device, the torque distribution and the gear ratio of the lowest speed can be set to various values.

The central differential and the control device are coaxially provided at the rear of the transmission in the small size. Thus, assembling the system becomes easy, and parts of the central differential, and the multiple-disk clutches can be commonly used to various types of the power trains.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. In an automatic transmission for a four-wheel drive motor vehicle, having an engine mounted on said vehicle, a torque converter directly connected to said engine and being housed in a transmission case for transmitting a torque of said engine to a front drive shaft and a rear drive shaft, a central differential coaxially mounted on an output shaft for differentiating speed between front and rear drive shafts, said central differential having a complex planetary gear device and a first friction clutch interposed between a first intermediate shaft connected with a carrier of said planetary gear device and said rear drive shaft, said front drive shaft being driven via said carrier, a fixed portion provided on said central differential, and said complex planetary gear device comprising a first pinion and a second pinion integrally supported by a carrier, and a second intermediate shaft meshed with said planetary gear device, the improvement of the automatic transmission which comprises:

a second friction clutch mounted on said fixed portion for restricting a differentiating function of said central differential; and a third friction clutch mounted on said second intermediate shaft for transmitting said power to said rear wheels in order to distribute said torque to said front and rear wheels by controlling said differential in dependency on said differentiating function.

2. The automatic transmission according to the claim 1, further comprising:

a first sun gear operatively connected to said output shaft in said central differential and meshed with said first pinion;

a second sun gear coaxially provided behind said first sun gear and rotatably connected to one of said drive shafts via said third friction clutch; and a ring gear meshed with one of said pinions and connected with said second friction clutch;

said central differential forms a simple planetary gear by locking said second friction clutch so as to gain a lower gear ratio than that of a first range of said automatic transmission so as to improve driveability of said four-wheel drive motor vehicle.

3. In an automatic transmission for a four-wheel drive motor vehicle, having an engine mounted on said vehicle, a torque converter directly connected to said engine and being housed in a transmission case for transmitting a torque of said engine to a front drive shaft and a rear drive shaft, a central differential coaxially mounted on an output shaft for differentiating speed between front and rear wheels, said central differential having a complex planetary gear device and a first friction clutch interposed between a first intermediate shaft connected with a carrier of said planetary gear device and said rear drive shaft, a fixed portion provided on said central differential, and said complex planetary gear device comprising a first pinion and a second pinion integrally supported by a carrier, and a second intermediate shaft meshed with said planetary gear, the improvement of the automatic transmission which comprises:

a second friction clutch mounted on said fixed portion for restricting a differentiating function of said central differential;

a third friction clutch mounted on said wheel shaft for transmitting said power to said wheels in order to distribute said torque to said front and rear wheels by controlling said differential in dependency on said differentiating function;

a first sun gear operatively connected to said output shaft in said central differential and meshed with said first pinion;

a second sun gear coaxially provided behind said first sun gear and rotatably connected to one of said drive shafts via said third friction clutch;

a ring gear meshed with one of said pinions and connected with said second friction clutch; and said second differential forms a simple planetary gear by locking said second friction clutch so as to gain a lower gear ratio than that of a first range of said automatic transmission so as to improve driveability of said four-wheel drive motor vehicle.

* * * * *